US010351656B2

(12) United States Patent
Holvoet et al.

(10) Patent No.: US 10,351,656 B2
(45) Date of Patent: Jul. 16, 2019

(54) SILYLATED POLYURETHANES

(71) Applicant: Huntsman International LLC, The Woodlands, TX (US)

(72) Inventors: Servaas Holvoet, Valtem-Beisem (BE); Christopher Phanopoulos, Moorsel (BE); Fabrice Desesquelles, Brussels (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 95 days.

(21) Appl. No.: 15/314,651

(22) PCT Filed: Jun. 10, 2015

(86) PCT No.: PCT/EP2015/062907
§ 371 (c)(1),
(2) Date: Nov. 29, 2016

(87) PCT Pub. No.: WO2015/193146
PCT Pub. Date: Dec. 23, 2015

(65) Prior Publication Data
US 2017/0198084 A1 Jul. 13, 2017

(30) Foreign Application Priority Data
Jun. 19, 2014 (EP) .................................... 14173096

(51) Int. Cl.
C08G 18/10 (2006.01)
C08G 18/38 (2006.01)
C08G 18/48 (2006.01)
C08G 18/76 (2006.01)
C08G 18/28 (2006.01)
C09D 175/08 (2006.01)
C09J 175/08 (2006.01)
C08G 101/00 (2006.01)

(52) U.S. Cl.
CPC ......... C08G 18/3893 (2013.01); C08G 18/10 (2013.01); C08G 18/289 (2013.01); C08G 18/4825 (2013.01); C08G 18/4854 (2013.01); C08G 18/7671 (2013.01); C09D 175/08 (2013.01); C09J 175/08 (2013.01); C08G 2101/00 (2013.01); C09J 2475/00 (2013.01)

(58) Field of Classification Search
CPC ............ C08G 18/3893; C08G 18/4825; C08G 18/7671; C08G 18/10; C08G 18/289; C08G 18/4854
See application file for complete search history.

(56) References Cited

U.S. PATENT DOCUMENTS

| 4,131,731 | A | 12/1978 | Lai et al. |
| 5,068,304 | A | 11/1991 | Higuchi et al. |
| 6,310,170 | B1 * | 10/2001 | Johnston ................ C08G 18/10 528/38 |
| 6,833,423 | B2 | 12/2004 | Roesler et al. |
| 7,879,955 | B2 * | 2/2011 | Rao ....................... C08G 18/089 525/460 |
| 8,114,233 | B2 | 2/2012 | Stanjek |
| 9,340,714 | B2 | 5/2016 | Stanjek et al. |
| 2002/0188068 | A1 | 12/2002 | Mack et al. |
| 2004/0127674 | A1 * | 7/2004 | Haubennestel ........ C08G 18/10 528/61 |
| 2004/0132950 | A1 | 7/2004 | Roesler et al. |
| 2006/0020101 | A1 | 1/2006 | Wintermantel et al. |
| 2007/0055010 | A1 | 3/2007 | Ludewig et al. |
| 2007/0270240 | A1 * | 11/2007 | Smith ................ A63B 37/0003 473/368 |
| 2009/0227710 | A1 * | 9/2009 | Porsch .................... C08G 18/10 524/35 |
| 2010/0078117 | A1 | 4/2010 | Stanjek |
| 2012/0245242 | A1 | 9/2012 | Peiffer et al. |
| 2013/0079538 | A1 | 3/2013 | Phanopoulos et al. |
| 2014/0311674 | A1 * | 10/2014 | Stanjek .............. C08G 18/4825 156/331.4 |
| 2016/0046793 | A1 | 2/2016 | Phanopoulos et al. |

FOREIGN PATENT DOCUMENTS

| DE | 102006054155 A | | 5/2008 |
| DE | 102008012971 A | | 5/2009 |
| DE | 102011087603 A | | 6/2013 |
| EP | 1619215 A | | 1/2006 |
| WO | 2013/079330 | * | 6/2013 |
| WO | WO2014173638 A | | 10/2014 |

OTHER PUBLICATIONS

Tri-Iso Inc. "Bayer Material Science Mondur ML" webpage http://www.tri-iso.com/documents/Bayer_Material_Science_Mondur_ML_TDS.pdf. (Year: 2018).*

* cited by examiner

Primary Examiner — Margaret G Moore
(74) Attorney, Agent, or Firm — Huntsman International LLC; Robert Diaz

(57) ABSTRACT

The present invention relates to a silylated polyurethane obtainable by a process comprising the step of contacting at least one isocyanate with at least one isocyanate-reactive compound and with at least one aminosilane; wherein said at least one isocyanate comprises 2,4'-methylene diphenyl diisocyanate, and wherein said at least one isocyanate comprises less than 50.0% by weight of said 2,4'-methylene diphenyl diisocyanate based on the total weight of said at least one isocyanate. The present invention also relates to a process for preparing said silylated polyurethane. The present invention also relates to formulations and compositions comprising said silylated polyurethane, and the use thereof for the preparation of adhesives, coatings, sealants, elastomers, or foams.

11 Claims, No Drawings

SILYLATED POLYURETHANES

CROSS-REFERENCE TO RELATED APPLICATIONS

This application is the National Phase of International Application PCT/EP2015/062907 filed Jun. 10, 2015 which designated the U.S. and which claims priority to European App. Serial No. 14173096.0 filed Jun. 19, 2014. The noted applications are incorporated herein by reference.

FIELD OF THE INVENTION

This invention relates to silylated polyurethanes, to a process for their preparation and to uses thereof.

BACKGROUND TO THE INVENTION

Many commercial compositions containing moisture curable silylated polymers are known, and have many commercial applications. For example, silylated polyurethanes are useful as coatings, adhesives, sealants and industrial elastomeric goods.

Silylated polyurethanes are typically prepared by reacting an isocyanate-containing prepolymer with an aminosilane; yielding products having generally high viscosity, and as a consequence, difficult processability. This high viscosity can be related to hydrogen bonding due to the presence of urea and urethane groups, so current solutions have focused on decreasing/eliminating the urethane/urea content in these silylated polyurethanes.

In the art, several methods have been described for decreasing/eliminating the urethane/urea content in silylated polyurethanes.

For example, long chain-polyether polyols can be used for preparing the polyurethane. However, the method requires polyether polyols with a high functionality and a low level of unsaturation and polydispersity and not all the hydrogen bond density can be eliminated.

Another example involves the reaction of OH-functional prepolymer with an isocyanatosilane, yielding an urea-free polyurethane. However, isocyanatosilanes may be objectionable from a toxicological standpoint. Additionally, raw material availability and price are often an issue.

Another example involves the partial or complete allophanatization and/or biuretization of the urethane/urea groups with mono-isocyanates, which sterically hinder hydrogen bond formation. This method however, requires an additional synthetic step after preparation of the silylated polyurethane, which increases production costs. In addition, monoisocyanates have environmental, health and safety issues.

Therefore, there remains a need for silylated polyurethanes and processes to prepare said polyurethanes that overcome one or more of the aforementioned issues. It is an object of the present invention to overcome one or more of the aforementioned issues.

SUMMARY OF THE INVENTION

The present inventors have now surprisingly found that one or more of these objects can be obtained by a silylated polyurethane as presently claimed.

Surprisingly, the present inventors have found that when making said silylated polyurethanes, the use of isocyanate comprising some amounts of 2,4'-methylene diphenyl diisocyanate yields minimal chain extension during end-capping of an isocyanate-containing prepolymer, leading to silylated polyurethane with lower viscosity. In the process according to the invention undesired secondary reactions on urea bonds, which yield extra chain extension and hence high viscosity, are limited and can be effectively suppressed.

According to a first aspect of the present invention, a silylated polyurethane is provided, said polyurethane being obtainable by a process comprising the step of contacting at least one isocyanate with at least one isocyanate-reactive compound and with at least one aminosilane; wherein said at least one isocyanate comprises 2,4'-methylene diphenyl diisocyanate, and wherein said at least one isocyanate comprises less than 50.0% by weight of said 2,4'-methylene diphenyl diisocyanate based on the total weight of said at least one isocyanate.

According to a second aspect, the present invention also encompasses a process for preparing a silylated polyurethane according to the first aspect of the invention, comprising the step of: contacting at least one isocyanate with at least one isocyanate-reactive compound; and with at least one aminosilane;
thereby preparing a silylated polyurethane; wherein said at least one isocyanate comprises 2,4'-methylene diphenyl diisocyanate, and wherein said at least one isocyanate comprises less than 50.0% by weight of said 2,4'-methylene diphenyl diisocyanate based on the total weight of said at least one isocyanate.

According to a third aspect, the invention encompasses a formulation comprising
at least one isocyanate; wherein said at least one isocyanate comprises 2,4'-methylene diphenyl diisocyanate,
at least one isocyanate-reactive compound and/or the adduct of said at least one isocyanate and said at least one isocyanate-reactive compound; and
at least one aminosilane;
wherein said at least one isocyanate comprises less than 50.0% by weight of said 2,4'-methylene diphenyl diisocyanate based on the total weight of said at least one isocyanate.

According to a fourth aspect, the present invention also encompasses a composition comprising a silylated polyurethane according to the first aspect of the invention.

According to a fifth aspect, the present invention also encompasses the use of a silylated polyurethane according to the first aspect of the invention, or a composition according to the fourth aspect of the invention, or a formulation according to the third aspect of the invention, for the preparation of adhesives, coatings, sealants, elastomers, or foams.

According to a sixth aspect, the invention encompasses a product comprising a silylated polyurethane according to the first aspect of the invention or a composition according to the fourth aspect of the invention, or obtained by curing a formulation according to the third aspect of the invention.

The independent and dependent claims set out particular and preferred features of the invention. Features from the dependent claims may be combined with features of the independent or other dependent claims as appropriate.

The above and other characteristics, features and advantages of the present invention will become apparent from the following detailed description, which illustrates, by way of example, the principles of the invention.

DETAILED DESCRIPTION OF THE INVENTION

Before the present formulations of the invention are described, it is to be understood that this invention is not limited to particular formulations described, since such formulations may, of course, vary. It is also to be understood that the terminology used herein is not intended to be limiting, since the scope of the present invention will be limited only by the appended claims.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

As used herein, the singular forms "a", "an", and "the" include both singular and plural referents unless the context clearly dictates otherwise. By way of example, "an isocyanate group" means one isocyanate group or more than one isocyanate groups.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

Throughout this application, the term "about" is used to indicate that a value includes the standard deviation of error for the device or method being employed to determine the value.

As used herein, the terms "% by weight", "wt %", "weight percentage", or "percentage by weight" are used interchangeably.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

Whenever the term "substituted" is used in the present invention, it is meant to indicate that one or more hydrogens on the atom indicated in the expression using "substituted" is replaced with a selection from the indicated group, provided that the indicated atom's normal valency is not exceeded.

Where groups may be optionally substituted, such groups may be substituted once or more, and preferably once, twice or thrice. Substituents may be selected from but not limited to, for example, the group comprising alkyl, cycloalkyl, aryl, alcohol, thiol, mercaptan, carboxylic acid, ester, amino, amido, ketone, ether and halide functional groups.

As used herein the terms such as "substituted or unsubstituted $C_{1-24}$alkyl", "substituted or unsubstituted $C_{3-24}$cycloalkyl", "substituted or unsubstituted $C_{6-24}$aryl" or "substituted or unsubstituted heteroaryl" are synonymous "$C_{1-24}$alkyl, $C_{3-24}$cycloalkyl, $C_{6-24}$aryl, heteroaryl each being optionally substituted with . . . ".

As used herein the terms such as "alkyl, aryl, cycloalkyl, or heteroaryl each being optionally substituted with . . . " or "alkyl, aryl, cycloalkyl, or heteroaryl optionally substituted with . . . " encompasses "alkyl optionally substituted with . . . ", "aryl optionally substituted with . . . ", "cycloalkyl optionally substituted with . . . " and so on.

As used herein, the term "halo" or "halogen" as a group or part of a group is generic for fluoro, chloro, bromo, iodo.

The term "$C_{1-24}$alkyl", as a group or part of a group, refers to a hydrocarbyl radical of formula $C_nH_{2n+1}$ wherein n is a number ranging from 1 to 24. Preferably, the alkyl group comprises from 1 to 20 carbon atoms, for example 1 to 10 carbon atoms, for example 1 to 6 carbon atoms, for example 1 to 4 carbon atoms. Alkyl groups may be linear, or branched and may be substituted as indicated herein. When a subscript is used herein following a carbon atom, the subscript refers to the number of carbon atoms that the named group may contain. Thus, for example, $C_{1-24}$alkyl means an alkyl of 1 to 24 carbon atoms. Thus, for example, $C_{1-6}$alkyl means an alkyl of 1 to 6 carbon atoms. Examples of alkyl groups are methyl, ethyl, propyl, isopropyl (i-propyl), butyl, isobutyl (i-butyl), sec-butyl, tert-butyl, pentyl and its chain isomers, hexyl and its chain isomers.

The term "$C_{3-24}$cycloalkyl" as a group or part of a group, refers to a cyclic alkyl group, that is to say, a monovalent, saturated, or unsaturated hydrocarbyl group having 1 or 2 cyclic structure. Cycloalkyl includes all saturated hydrocarbon groups containing 1 to 2 rings, including monocyclic or bicyclic groups. Cycloalkyl groups may comprise 3 or more carbon atoms in the ring and generally, according to this invention comprise from 3 to 24, preferably 3 to 10; more preferably 3 to 6 carbon atoms. Examples of "$C_{3-10}$cycloalkyl" groups include but are not limited to cyclopropyl, cyclobutyl, cyclopentyl, cyclohexyl, cycloheptyl, cyclooctyl, cyclononyl, cyclodecyl. Examples of "$C_{3-6}$cycloalkyl" groups include but are not limited to cyclopropyl, cyclobutyl, cyclopentyl, cyclohexyl.

When the suffix "ene" is used in conjunction with an alkyl group, i.e. "alkylene", this is intended to mean the alkyl group as defined herein having two single bonds as points of attachment to other groups. For example, the term "$C_{1-20}$alkylene", as a group or part of a group, refers to $C_{1-20}$alkyl groups that are divalent, i.e., with two single bonds for attachment to two other groups. In a similar manner, the term "$C_{1-6}$alkylene", by itself or as part of another substituent, refers to $C_{1-6}$alkyl groups that are divalent, i.e., with two single bonds for attachment to two other groups. Alkylene groups may be linear or branched and may be substituted as indicated herein. Non-limiting examples of alkylene groups include methylene (—$CH_2$—), ethylene (—$CH_2$—$CH_2$—), methylmethylene (—$CH(CH_3)$—), 1-methyl-ethylene (—$CH(CH_3)$—$CH_2$—), n-propylene (—CH$_2$—CH$_2$—CH$_2$—), 2-methylpropylene (—CH$_2$—CH(CH$_3$)—CH$_2$—), 3-methylpropylene (—CH$_2$—CH$_2$—CH(CH$_3$)—), n-butylene (—CH$_2$—CH$_2$—CH$_2$—CH$_2$—), 2-methylbutylene (—CH$_2$—CH(CH$_3$)—CH$_2$—CH$_2$—), 4-methylbutylene (—CH$_2$—CH$_2$—CH$_2$—CH(CH$_3$)—), pentylene and its chain isomers, hexylene and its chain isomers.

The term "aryl", as a group or part of a group, refers to a polyunsaturated, aromatic hydrocarbyl group having a single ring (i.e. phenyl) or multiple aromatic rings fused together (e.g. naphthyl) or linked covalently, typically containing 6 to 24 carbon atoms; preferably 6 to 10 carbon atoms, wherein at least one ring is aromatic. The aromatic ring may optionally include one to two additional rings fused thereto. Aryl is also intended to include the partially hydrogenated derivatives of the carbocyclic systems enumerated herein. Non-limiting examples of aryl comprise phenyl, biphenylyl, biphenylenyl, 5- or 6-tetralinyl, 1-, 2-, 3-, 4-, 5-, 6-, 7- or 8-azulenyl, naphthalen-1- or -2-yl, 4-, 5-, 6- or 7-indenyl, 1- 2-, 3-, 4- or 5-acenaphtylenyl, 3-, 4- or 5-acenaphtenyl, 1-, 2-, 3-, 4- or 10-phenanthryl, 1- or 2-pentalenyl, 4- or 5-indanyl, 5-, 6-, 7- or 8-tetrahydronaphthyl, 1,2,3,4-tetrahydronaphthyl, 1,4-dihydronaphthyl, 1-, 2-, 3-, 4- or 5-pyrenyl. "C$_{6-10}$aryl" refers to an aryl containing 6 to 10 atoms; wherein at least one ring is aromatic. Examples of C$_{6-10}$aryl include phenyl, naphthyl, indanyl, or 1,2,3,4-tetrahydro-naphthyl.

When the suffix "ene" is used in conjunction with an aryl group; i.e. arylene, this is intended to mean the aryl group as defined herein having two single bonds as points of attachment to other groups. For example, the term "C$_{6-20}$arylene" as a group or part of a group, refers to C$_{6-20}$aryl groups that are divalent, i.e., with two single bonds for attachment to two other groups; suitable C$_{6-20}$arylene groups include 1,4-phenylene, 1,2-phenylene, 1,3-phenylene, biphenylylene, naphthylene, indenylene, 1-, 2-, 5- or 6-tetralinylene, and the like.

The term "heteroaryl" as a group or part of a group, refers but is not limited to 5 to 12 carbon-atom aromatic rings or ring systems containing 1 to 2 rings which are fused together or linked covalently, typically containing 5 to 6 atoms; at least one of which is aromatic in which one or more carbon atoms in one or more of these rings can be replaced by N, O and/or S atoms where the N and S heteroatoms may optionally be oxidized and the N heteroatoms may optionally be quaternized. Such rings may be fused to an aryl, cycloalkyl, heteroaryl or heterocyclyl ring. Non-limiting examples of such heteroaryl, include: pyrrolyl, furanyl, thiophenyl, pyrazolyl, imidazolyl, oxazolyl, isoxazolyl, thiazolyl, isothiazolyl, triazolyl, oxadiazolyl, thiadiazolyl, tetrazolyl, oxatriazolyl, thiatriazolyl, pyridinyl, pyrimidyl, pyrazinyl, pyridazinyl, oxazinyl, dioxinyl, thiazinyl, triazinyl, imidazo[2,1-b][1,3]thiazolyl, thieno[3,2-b]furanyl, thieno[3,2-b]thiophenyl, thieno[2,3-d][1,3]thiazolyl, thieno[2,3-d]imidazolyl, tetrazolo[1,5-a]pyridinyl, indolyl, indolizinyl, isoindolyl, benzofuranyl, isobenzofuranyl, benzothiophenyl, isobenzothiophenyl, indazolyl, benzimidazolyl, 1,3-benzoxazolyl, 1,2-benzisoxazolyl, 2,1-benzisoxazolyl, 1,3-benzothiazolyl, 1,2-benzoisothiazolyl, 2,1-benzoisothiazolyl, benzotriazolyl, 1,2,3-benzoxadiazolyl, 2,1,3-benzoxadiazolyl, 1,2,3-benzothiadiazolyl, 2,1,3-benzothiadiazolyl, benzo[d]oxazol-2(3H)-one; 2,3-dihydro-benzofuranyl; thienopyridinyl, purinyl, imidazo[1,2-a]pyridinyl, 6-oxo-pyridazin-1(6H)-yl, 2-oxopyridin-1(2H)-yl, 6-oxo-pyridazin-1(6H)-yl, 2-oxopyridin-1(2H)-yl, 1,3-benzodioxolyl, quinolinyl, isoquinolinyl, cinnolinyl, quinazolinyl, quinoxalinyl; preferably said heteroaryl group is selected from the group consisting of pyridyl, 1,3-benzodioxolyl, benzo[d]oxazol-2(3H)-one; 2,3-dihydro-benzofuranyl; pyrazinyl, pyrazolyl, pyrrolyl, imidazolyl, benzimidazolyl, pyrimidinyl, triazolyl and thiazolyl.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

According to a first aspect of the present invention, a silylated polyurethane is provided wherein said polyurethane is obtainable by a process comprising the step of contacting at least one isocyanate with at least one isocyanate-reactive compound and with at least one aminosilane; wherein said at least one isocyanate comprises 2,4'-methylene diphenyl diisocyanate, and wherein said at least one isocyanate comprises less than 50.0% by weight of said 2,4'-methylene diphenyl diisocyanate based on the total weight of said at least one isocyanate.

According to the invention, said at least one isocyanate comprises 2,4'-methylene diphenyl diisocyanate, in an amount of less than 50.0% by weight of said 2,4'-methylene diphenyl diisocyanate based on the total weight of said at least one isocyanate.

Preferably, said at least one isocyanate comprises only difunctional isocyanate specifies, preferably only difunctional methylene diphenyl diisocyanate isomers, less than 50% by weight of this difunctional isocyanate being 2,4'-methylene diphenyl diisocyanate.

In some embodiments, said at least one isocyanate comprises at most 49.90% by weight of 2,4'-methylene diphenyl diisocyanate; preferably at most 45.0% by weight of isocyanate; preferably at most 40.0% by weight of isocyanate; preferably at most 39.0% by weight of 2,4'-methylene diphenyl diisocyanate; preferably at most 37.0% by weight of 2,4'-methylene diphenyl diisocyanate based on the total weight of said at least one isocyanate.

In some embodiments, said at least one isocyanate comprises at least 5.0% by weight of 2,4'-methylene diphenyl diisocyanate, preferably at least 10.0% by weight of 2,4'-methylene diphenyl diisocyanate, preferably at least 15.0% by weight of 2,4'-methylene diphenyl diisocyanate; preferably at least 25.0% by weight of isocyanate; preferably at least 30.0% by weight of isocyanate; preferably at least 37.0% by weight of 2,4'-methylene diphenyl diisocyanate based on the total weight of said at least one isocyanate.

In a preferred embodiment the amount of 2,4'-methylene diphenyl diisocyanate is within the range 17 to 37 wt % of the isocyanate.

In some embodiments, said at least one isocyanate is a mixture comprising 2,4'-methylene diphenyl diisocyanate and at least one polyisocyanate selected from the group comprising aromatic, cycloaliphatic, heterocyclic, araliphatic or aliphatic organic isocyanates.

Suitable polyisocyanates comprise polyisocyanates of the type R$^a$—(NCO)$_x$ with x being at least 1 and R$^1$ being an aromatic or aliphatic group, such as diphenylmethane, toluene, dicyclohexylmethane, hexamethylene, or a similar polyisocyanate. Preferably, said polyisocyanate comprises at least two isocyanate groups.

Non-limiting examples of suitable organic polyisocyanates which may be used in the present invention include aliphatic isocyanates such as hexamethylene diisocyanate; and aromatic isocyanates such as diphenylmethane diisocyanate (MDI), in the form of mixtures of its 2,4'-, 2,2'- and 4,4'-isomers and mixtures of diphenylmethane diisocyanates (MDI) and oligomers thereof, as well as polymeric methylene diphenyl diisocyanate (pMDI), m- and p-phenylene diisocyanate, tolylene-2,4- and tolylene-2,6-diisocyanate (also known as toluene diisocyanate, and referred to as TDI, such as 2,4 TDI and 2,6 TDI) in any suitable isomer mixture, chlorophenylene-2,4-diisocyanate, naphthylene-1,5-diisocyanate, diphenylene-4,4'-diisocyanate, 4,4'-diisocyanate-3,3'-dimethyl-diphenyl, 3-methyl-diphenylmethane-4,4'-diisocyanate and diphenyl ether diisocyanate; and cycloaliphatic diisocyanates such as cyclohexane-2,4- and -2,3-diisocyanate, 1-methylcyclohexyl-2,4- and -2,6-diisocyanate and mixtures thereof and bis-(isocyanatocyclohexyl)methane (e.g. 4,4'-diisocyanatodicyclohexylmethane (H12MDI)), triisocyanates such as 2,4,6-triisocyanatotoluene and 2,4,4-triisocyanatodiphenylether, isophorone diisocyanate (IPDI), butylene diisocyanate, trimethylhexamethylene diisocyanate, isocyanatomethyl-1,8-octane diisocyanate, tetramethylxylene diisocyanate (TMXDI), 1,4-cyclohexanediisocyanate (CDI), and tolidine diisocyanate (TODI); any suitable mixture of these polyisocyanates.

Preferably, the polyisocyanates that can be used in the present invention may be mixtures comprising 2,4'-methylene diphenyl diisocyanate and a polyisocyanate selected from the group comprising toluene diisocyanates (TDI), diphenylmethane diisocyanate (MDI)—type isocyanates, and prepolymers of these isocyanates.

The polymeric methylene diphenyl diisocyanate can be any mixture of MDI (as defined herein above) and higher homologues of formula (A):

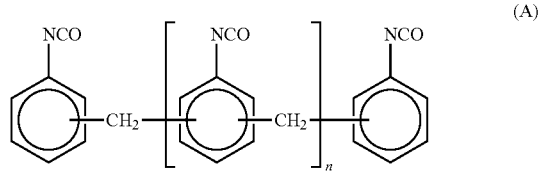

(A)

wherein n is an integer which can be from 1 to 10, preferably from 1 to 5.

Preferably, said at least one isocyanate is a mixture comprising 2,4'-methylene diphenyl diisocyanate and at least one polyisocyanate selected from the group comprising 2,2'-methylene diphenyl diisocyanate; 4,4'-methylene diphenyl diisocyanate; hexamethylene diisocyanate; m- and p-phenylene diisocyanate; tolylene-2,4-diisocyanate; tolylene-2,6-diisocyanate; chlorophenylene-2,4-diisocyanate, naphthylene-1,5-diisocyanate, diphenylene-4,4'-diisocyanate, 4,4'-diisocyanate-3,3'-dimethyl-diphenyl, 3-methyl-diphenylmethane-4,4'-diisocyanate; diphenyl ether diisocyanate; cyclohexane-2,4-diisocyanate; cyclohexane-2,3-diisocyanate; 1-methylcyclohexyl-2,4-diisocyanate; 1-methylcyclohexyl-2,6-diisocyanate; bis-(isocyanatocyclohexyl)methane; 2,4,6-triisocyanatotoluene; 2,4,4-triisocyanatodiphenylether, isophorone diisocyanate, butylene diisocyanate, trimethylhexamethylene diisocyanate, isocyanatomethyl-1,8-octane diisocyanate, tetramethylxylene diisocyanate, 1,4-cyclohexanediisocyanate, and tolidine diisocyanate (TODI); oligomers, polymers, and mixtures thereof.

More preferably, said at least one isocyanate is a mixture comprising 2,4'-methylene diphenyl diisocyanate and a polyisocyanate selected from the group comprising 2,2'-methylene diphenyl diisocyanate, 4,4'-methylene diphenyl diisocyanate, oligomers thereof such as pMDI, prepolymers thereof, and mixtures thereof.

Most preferably, said at least one isocyanate is a mixture comprising 2,4'-methylene diphenyl diisocyanate and 4,4'-methylene diphenyl diisocyanate whereby the weight ranges 2,4'-MDI/4,4'-MDI vary between 5/95 and 45/55, preferably between 10/90 and 40/60, more preferably between 15/85 and 40/60, most preferably about 37/63.

In some embodiments, the at least one isocyanate can have an NCO value ranging from 0.1% to 36% by weight.

The NCO value (also referred to as percent NCO or NCO content) of the isocyanate can be measured by titration with dibutylamine according to the DIN 53185 standard. The NCO value is expressed in weight %.

In some embodiments, the at least one isocyanate-reactive compound may be a component containing isocyanate-reactive hydrogen atoms. As used herein, the term "component containing isocyanate-reactive hydrogen atoms" refers to compounds that contain acidic hydrogen atoms, which make the compounds that bear them, susceptible to electrophilic attack by an isocyanate group. Examples of suitable isocyanate-reactive compounds containing isocyanate-reactive hydrogen atoms include polyols such as glycols or even relatively high molecular weight polyether polyols and polyester polyols, thiols (mercaptans), carboxylic acids such as polybasic acids, amines, polyamines, components comprising at least one alcohol group and at least one amine group, such as polyaminepolyols, urea and amides, and other acidic proton species which are thus by virtue of their proximity to electron withdrawing groups such as carboxyl or aryl groups.

There may be a mix of functional moieties mentioned above in the isocyanate-reactive compound and the cumulative number average functionality of the isocyanate-reactive compound is generally greater than 1, preferably greater than 2.

In some embodiments, said at least one isocyanate-reactive compound may have a number average molecular weight of at least 200 Da; preferably of at least 500 Da; more preferably of at least 1000 Da, most preferably of at least 2000 Da. In some embodiments, said at least one isocyanate-reactive compound may have a number average molecular weight of at most 20000 Da; preferably of at most 10000 Da; more preferably of at most 8000 Da, still most preferably of at most 6000 Da. In some embodiments, said at least one isocyanate-reactive compound may have a number average molecular weight of at least 200 to at most 20000 Da; preferably of at least 500 to at most 10000 Da; more preferably of at least 1000 to at most 8000 Da.

The OH value (also referred to as OH number or OH content) of the isocyanate-reactive compound can be measured according to the ASTM D 1957 standard. The OH value is expressed in mg KOH/g.

In some preferred embodiments, said at least one isocyanate-reactive compound comprises at least one isocyanate-reactive group, preferably an OH group; and the molar ratio of the NCO of said at least one isocyanate, to the isocyanate-reactive group (preferably OH) of said at least one isocyanate-reactive compound is greater than 1, preferably at least 1.1, more preferably at least 2.

In some embodiments, the molar ratio of the NCO of said at least one isocyanate, to the isocyanate-reactive group (preferably OH) of said at least one isocyanate-reactive compound is of at most 20, preferably at most 10.0, more preferably at most 7.0, and most preferably at most 5.0; and most preferably from at least 2.0 to at most 4.0.

In some preferred embodiments, the at least one isocyanate-reactive compound is selected from the group comprising hydroxyl terminated polyether (polyether polyols); polyols such as glycols; hydroxyl terminated polyester (polyester polyols); hydroxyl terminated polycarbonate and mixtures thereof, all of which are well known to those skilled in the art.

Suitable hydroxyl terminated polyesters (polyester polyols), can be generally a polyester having a molecular weight (Mn) of at least 200 to at most 20000 Da, desirably from at least 500 to at most 10000 Da, more preferably of at least 1000 to at most 8000 Da, even more preferably from at least 2000 to 6000 Da, and most preferably of at least 2000 to at most 4000 Da. The molecular weight is determined by assay of the terminal functional groups and is related to the number average molecular weight. The hydroxyl terminated polyester can be produced by (1) an esterification reaction of one or more glycols with one or more dicarboxylic acids or anhydrides or (2) by transesterification reaction, i.e. the reaction of one or more glycols with esters of dicarboxylic acids. Mole ratios generally in excess of more than one mole of glycol to acid are preferred so as to obtain linear chains having a preponderance of terminal hydroxyl groups. Suitable polyesters also include various lactones such as polycaprolactone typically made from caprolactone and a bifunctional initiator such as diethylene glycol. The dicarboxylic acids of the desired polyester can be aliphatic, cycloaliphatic, aromatic, or combinations thereof. Suitable dicarboxylic acids which can be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is the preferred acid. The glycols which are reacted to form a desirable polyester intermediate can be aliphatic, aromatic, or combinations thereof, and have a total of from 2 to 12 carbon atoms, and include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and the like. 1,4-Butanediol is the preferred glycol.

Suitable hydroxyl terminated polyethers are preferably polyether polyols derived from a diol or polyol having a total of from 2 to 15 carbon atoms, preferably an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, polypropylene glycol) comprising propylene oxide reacted with propylene glycol, poly(tetramethylglycol) (PTMG) comprising water reacted with tetrahydrofuran (THF). Polyether polyols further include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the current invention. Typical copolyethers include the reaction product of glycerol and ethylene oxide or glycerol and propylene oxide. The various polyethers can have a molecular weight (Mn) of at least 200 to at most 20000 Da, desirably from at least 500 to at most 10000 Da, more preferably of at least 1500 to at most 8000 Da, even more preferably from at least 2000 to 6000 Da.

Suitable hydroxyl terminated polycarbonates for the present invention can be prepared by reacting a glycol with a carbonate. U.S. Pat. No. 4,131,731 is hereby incorporated by reference for its disclosure of hydroxyl terminated polycarbonates and their preparation. Such polycarbonates are preferably linear and have terminal hydroxyl groups with essential exclusion of other terminal groups. The reactants are glycols and carbonates. Suitable glycols are selected from cycloaliphatic and aliphatic diols containing 4 to 40, and preferably 4 to 12 carbon atoms, and from polyoxyalkylene glycols containing 2 to 20 alkoxy groups per molecule with each alkoxy group containing 2 to 4 carbon atoms. Suitable diols include but are not limited to aliphatic diols containing 4 to 12 carbon atoms such as butanediol-1,4, pentanediol-1,4, neopentyl glycol, hexanediol-1,6, 2,2,4-trimethylhexanedion-1,6, decanediol-1,10, hydrogenated dilinoleylglycol, hydrogenated diolelylglycol; and cycloaliphatic diols such as cyclohexanediol-1,3, dimethylolcyclohexane-1,4, cyclohexanediol-1,4, dimethylolcyclohexane-1,3, 1,4-endomethylene-2-hydroxy-5-hydroxymethyl cyclohexane, and polyalkylene glycols. The diols used in the reaction may be a single diol or a mixture of diols depending on the properties desired in the finished product. Non-limiting examples of suitable carbonates include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate and 2,4-pentylene carbonate. Also suitable are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Preferred examples of diarylcarbonates, which can contain 6 to 20 carbon atoms in each aryl group, are diphenylcarbonate, ditolylcarbonate and dinaphthylcarbonate.

In some embodiments, the isocyanate-reactive component can be reacted with the isocyanate, along with extender glycol. Non-limiting examples of suitable extender glycols (i.e., chain extenders) include lower aliphatic or short chain glycols having from about 2 to about 10 carbon atoms and include, for instance, ethylene glycol, diethylene glycol, propylene glycol, dipropylene glycol, 1,4-butanediol, 1,6-hexanediol, 1,3-butanediol, 1,5-pentanediol, 1,4-cyclohexanedimethanol, hydroquinone di(hydroxyethyl)ether, neopentylglycol, and the like.

In some embodiments, said at least one isocyanate-reactive compound has an average reactive functionality of at least 1.8 and preferably at least 2. As used herein, the term "average reactive functionality" refers to the average number of reactive groups (functionality) per molecule, averaged over a statistically relevant number of molecules present in the isocyanate-reactive compound.

The silylated polyurethane is obtainable by contacting the at least one isocyanate with the at least one isocyanate-reactive compound and with at least one aminosilane.

Preferably, the aminosilane is an alkoxysilane compound bearing an amino group.

In some embodiments, the at least one aminosilane is a compound of formula (I), $$R^1-NH-R^2-Si-(OR^3)_{3-n}(R^4)_n \qquad (I)$$

wherein,
$R^1$ is selected from H; $C_{1-24}$alkyl; $C_{3-24}$cycloalkyl; $C_{6-24}$aryl; or heteroaryl; and wherein said $C_{1-24}$alkyl; $C_{3-24}$cycloalkyl; $C_{6-24}$aryl; or heteroaryl can be unsubstituted or substituted with one or more alkyl groups, cycloalkyl groups, aryl groups, halogen atoms or COOH groups;
$R^2$ is selected from $C_{1-20}$alkylene or $C_{6-20}$arylene;
$R^3$ is selected from $C_{1-20}$alkyl; and $C_{6-20}$aryl;
$R^4$ is selected from $C_{1-20}$alkyl; and $C_{6-20}$aryl;
n is an integer selected from 0, 1 or 2.

In some embodiments, the at least one aminosilane is a compound of formula (I), wherein,
$R^1$ is selected from H; $C_{1-6}$alkyl; $C_{3-10}$cycloalkyl; $C_{6-10}$aryl; or heteroaryl; and wherein said $C_{1-6}$alkyl; $C_{3-10}$cycloalkyl; $C_{6-10}$aryl; or heteroaryl can be unsubstituted or substituted with one or more alkyl groups, cycloalkyl groups, aryl groups, halogen atoms or COOH groups;
$R^2$ is selected from $C_{1-6}$alkylene or $C_{6-10}$arylene;
n is an integer selected from 0 or 1;
$R^3$ is selected from $C_{1-4}$alkyl; and $C_{6-10}$aryl;
$R^4$ is selected from $C_{1-4}$alkyl; and $C_{6-10}$aryl.

In some embodiments, the at least one aminosilane is a compound of formula (I), wherein,
$R^1$ is selected from H; $C_{1-6}$alkyl; $C_{3-10}$cycloalkyl; $C_{6-10}$aryl; and wherein said $C_{1-6}$alkyl; $C_{3-10}$cycloalkyl; $C_{6-10}$aryl can be unsubstituted or substituted with one or more alkyl groups, cycloalkyl groups, aryl groups, halogen atoms or COOH groups;
$R^2$ is selected from $C_{1-6}$alkylene, and is most preferably a $C_1$- or $C_3$-alkylene;
n is an integer selected from 0 or 1;
$R^3$ is selected from $C_{1-4}$alkyl;
$R^4$ is selected from $C_{1-4}$alkyl.

In some embodiments, said at least one aminosilane is selected from the group comprising gamma-N-phenylaminopropyltrimethoxysilane, alpha-N-phenylaminomethyltrimethoxysilane, gamma-N-phenylaminopropyldimethoxymethylsilane, alpha-N-phenylaminomethyldimethoxymethylsilane, gamma-N-phenyl aminopropyltriethoxysilane, alpha-N-phenylaminomethyltriethoxysilane, gamma-N-phenylaminopropyldiethoxyethylsilane, alpha-N-phenylaminomethyldiethoxyethylsilane, gamma-N-butylaminopropyltrimethoxysilane, alpha-N-butylaminomethyltrimethoxysilane, gamma-N-butylaminopropyldimethoxymethylsilane, alpha-N-butylaminomethyldimethoxymethylsilane, gamma-N-butylaminopropyltriethoxysilane, alpha-N-butylaminomethyltriethoxysilane, gamma-N-butylaminopropyldiethoxyethylsilane, alpha-N-butylaminomethyldiethoxyethylsilane, gamma-N-methylaminopropyltrimethoxysilane, alpha-N-methylaminomethyltrimethoxysilane, gamma-N-methylaminopropyldimethoxymethylsilane, alpha-N-methylaminomethyldimethoxymethylsilane, gamma-N-methyl aminopropyltriethoxysilane, alpha-N-methylaminomethyltriethoxysilane, gamma-N-methylaminopropyldiethoxyethylsilane, alpha-N-methylaminomethyldiethoxy ethylsilane, gamma-N-cyclohexylaminopropyltrimethoxysilane, alpha-N-cyclohexylaminomethyltrimethoxysilane, gamma-N-cyclohexylaminopropyldimethoxymethylsilane, alpha-N-cyclohexylaminomethyldimethoxymethylsilane, gamma-N-cyclohexylaminopropyltriethoxysilane, alpha-N-cyclohexylaminomethyltriethoxysilane, gamma-N-cyclohexylaminopropyldiethoxyethylsilane, alpha-N-cyclohexylaminomethyldiethoxyethylsilane, gamma-aminopropyltrimethoxysilane, alpha-aminomethyltrimethoxysilane, gamma-aminopropyldimethoxymethylsilane, alpha-aminomethyldimethoxymethylsilane, gamma-aminopropyltriethoxysilane, alpha-aminomethyltriethoxysilane, gamma-aminopropyldiethoxyethylsilane, alpha-aminomethyldiethoxyethylsilane and mixtures thereof. Preferably, the at least one aminosilane is selected from the group comprising gamma-N-phenylaminopropyltrimethoxysilane, gamma-N-butylaminopropyltrimethoxysilane, gamma-N-methylaminopropyltrimethoxysilane, gamma-N-cyclohexylaminopropyltrimethoxysilane, gamma-aminopropyltrimethoxysilane and mixtures thereof.

In some embodiments, said silylated polyurethane is obtainable by (a) contacting at least one isocyanate with at least one isocyanate-reactive compound and (b) contacting the product of step (a) with said at least one aminosilane; wherein the molar ratio of said at least one aminosilane, to the NCO of the product of step (a) is greater than 0.5.

In some embodiment, the molar ratio of said at least one aminosilane, to the NCO of the product of step (a) is of at least 0.50 to at most 2.0, preferably of at least 0.90 to at most 1.5, more preferably of at least 1.0 to at most 1.2.

The NCO value (also referred to as percent NCO or NCO content) of the product of step (a) is preferably measured by titration with dibutylamine according to the DIN 53185 standard. The NCO value is expressed in weight %.

The NCO value of the product of step (a) is preferably between 0.1 and 10% by weight.

The present inventors have found that the silylated polyurethane according to the first aspect of the invention can have an improved processability, due to low viscosity. This effect was even observed without the need of a plasticizer.

Preferably, the viscosity is measured before addition of a plasticizer or a viscosity reducer, herein referred to as a "non-plasticized silylated polyurethane".

In some embodiments, the viscosity of the (non-plasticized) silylated polyurethane is at most 100 Pa·s, preferably at most 90 Pa·s, more preferably at most 75 Pa·s, most preferably at most 60 Pa·s, at 25° C. In some preferred embodiments, the viscosity of the (non-plasticized) silylated polyurethane ranges from at least 1.0 to at most 100 Pa·s, for example from at least 1.5 to at most 100 Pa·s, for example from at least 2.0 to at most 100 Pa·s, for example from at least 2.5 to at most 100 Pa·s, for example from at least 5.0 to at most 100 Pa·s, wherein the viscosity is measured at 25° C. using Brookfield Viscometer (model DV-II, spindle 21, rpm according 30-80% of full scale) according to the ASTM D 4889 standard without any plasticizer added to the silylated polyurethane.

The silylated polyurethane may comprise one or more additives. In some embodiments, each additive is present in an amount of at least 0.01% by weight, for example at least 0.03% by weight, for example at least 0.1% by weight, preferably at least 0.3% by weight, for example at least 0.5%, based on the total weight of the silylated polyurethane.

One such additive may be a plasticizer. Preferably, the amount of plasticizer in the polyurethane is limited. Suitable plasticizers, for purposes of the present invention, comprise conventional plasticizers known in the art, such as esters of dibasic or polybasic carboxylic acids with monohydric alcohols. Non-limiting examples of such polycarboxylic acids may be selected from the group comprising succinic acid, isophthalic acid, trimellitic acid, phthalic acid anhydride, tetrahydrophthalic acid anhydride, hexahydrophthalic acid anhydride, endomethylene-tetrahydrophthalic acid anhydride, glutaric acid anhydride, maleic acid anhydride, fumaric acid and dimeric and trimeric fatty acids (such as oleic acid), and combinations thereof, which may be mixed with monomeric fatty acids. Non-limiting examples of suitable monohydric alcohols comprise $C_{1-20}$ linear, branched or cyclic hydroxyalkyl containing only one free OH group (also referred as monohydric $C_{1-20}$ hydroxyalkyl); polyesters containing only one free OH group (monohydric polyester), heterocyclyl containing only one free OH group (monohydric heterocyclyl); oxygen containing heterocyclyl containing only one free OH group, and blends thereof. For example, said monohydric alcohol can be a $C_{1-20}$ monohydric hydroxyalkyl, a $C_{2-18}$ monohydric hydroxyalkyl, $C_{3-18}$ monohydric hydroxyalkyl, a $C_{4-18}$ monohydric hydroxyalkyl, a $C_{5-18}$ monohydric hydroxyalkyl, a $C_{6-18}$ monohydric hydroxyalkyl, or a $C_{6-18}$ monohydric hydroxyalkyl. Suitable polyesters comprise compounds containing at least one ester group and bearing at least one pendant alkyl or alkenyl group of at least four carbon atoms, said alkyl or said alkenyl group being substituted with only one free hydroxyl group. Examples of suitable monohydric oxygen containing heterocyclyl are cyclic trimethylolpropane formal and trimethylolpropane oxetane.

Other examples of suitable plasticizers may be selected from the group comprising phthalates, such as dioctyl phthalate, diisooctyl phthalate, diisononyl phthalate, dimethyl phthalate, dibutyl phthalate; phosphates, such as tributyl phosphate, triethyl phosphate (TEP), triphenyl phosphate and cresyl diphenyl phosphate; chlorinated biphenyls; aromatic oils; adipates, such as diisononyl adipate and di-(2-ethylhexyl) adipate; and combinations thereof. Specific examples of suitable plasticizers are commercially available from BASF Corporation under the trademark of PALATINOL®, such as PALATINOL® 711P, and under the trademark of PLASTOMOLL®, such as PLASTOMOLL® DNA and PLASTOMOLL® DOA.

Other examples of suitable plasticizers comprise phosphoric acid esters of the above-mentioned branched and unbranched aliphatic, cycloaliphatic and aromatic alcohols. If appropriate, phosphates of halogenated alcohols, for example, trichloroethyl phosphate, can also be employed. It is to be appreciated that mixed esters of the aforementioned alcohols and carboxylic acids can also be employed. So called polymeric plasticizers can also be employed for purposes of the present invention. Examples of such plasticizers may be selected from the group comprising polyesters of adipic acid, sebacic acid or phthalic acid. Phenol alkysulfonates, e.g. phenyl paraffinsulfonates, can also be employed. It is to be appreciated that the silylated polyurethane may comprise any combination of two or more of the aforementioned plasticizers. Alternatively, such plasticizers may also be selected from alkylene carbonates, such as propylene carbonate and ethylene carbonate. These are commercially available from Huntsman under the Jeffsol® trademark.

Other suitable additives include moisture scavengers such as carbamato-silane, epoxy silane and other similar additives used frequently by those skilled in the art. Still other additives could be adhesion promoters such as, but not limited to, DAMO and other aminotrimethoxysilanes, and stabilisers (UV and/or light).

According to a second aspect, the present invention also encompasses a process for preparing a silylated polyurethane according to the first aspect of the invention, comprising the step of:
contacting at least one isocyanate with at least one isocyanate-reactive compound; and with at least one aminosilane;
thereby preparing a silylated polyurethane; wherein said at least one isocyanate comprises 2,4'-methylene diphenyl diisocyanate, and wherein said at least one isocyanate comprises less than 50.0% by weight of said 2,4'-methylene diphenyl diisocyanate based on the total weight of said at least one isocyanate.

The descriptions of the isocyanate, the isocyanate-reactive compound and the aminosilane, for the polyurethane, apply mutatis mutandis to the process according to the second aspect of the invention.

Preferably the process comprises the steps of:
(a) contacting at least one isocyanate with at least one isocyanate-reactive compound optionally in the presence of the catalyst; and
(b) contacting the product of step (a) with at least one aminosilane;
thereby preparing said silylated polyurethane.

Said process can also comprise the steps of:
(a) mixing at least one isocyanate with at least one isocyanate-reactive compound optionally in the presence of the catalyst; and
(b) mixing the product of step (a) with at least one aminosilane;
thereby preparing said silylated polyurethane.

Preferably, the addition of the at least one isocyanate and the addition of the at least one isocyanate-reactive compound is a stepwise process. In some embodiments, said process comprises the steps of:
(a) mixing and/or reacting at least one isocyanate with at least one isocyanate-reactive compound optionally in the presence of the catalyst; and
(b) subsequently, mixing and/or reacting the product of step (a) with at least one aminosilane.

The at least one isocyanate-reactive compound, may be gradually added to the at least one isocyanate, for example step-wise, or it may be continuously added, for example drop-wise. Preferably, the isocyanate-reactive compound is added drop-wise.

In some embodiments, the process can be performed at a temperature of at least 25° C., for example at least 25° C. and at most 125° C.

Preferably the process comprises the step of contacting the adduct of the isocyanate and the isocyanate-reactive compound with the aminosilane. Preferably, said process is performed at a temperature of at least 25° C. to at most 125° C., preferably at least 35° C. to at most 100° C., more preferably at least 40° C. to at most 80° C.

The at least one aminosilane may be gradually added to the product of step (a), for example step-wise, or it may be continuously added, for example drop-wise. Preferably, the aminosilane is added drop-wise. Alternatively the product of step (a) can be added, gradually or continuously, to the aminosilane.

In some embodiments, the aminosilane can be added to the adduct of step (a) at a rate of at least 1% of aminosilane/minute, for example at a rate ranging from 1% aminosilane/min. to 20% aminosilane/min., preferably from 2% aminosilane/min. to 10% aminosilane/min., more preferably from 8% aminosilane/min. to 20% aminosilane/min. In all cases, the addition rate should be such to ensure that any exotherm will not increase the temperature of the mixture above 95° C.—the rate of addition in this sense is thus also defined by the mixing vessel and its ability to remove heat.

In some embodiments, the stirring rate can be ranging from 50 rpm to 500 rpm, preferably from 100 rpm to 300 rpm, more preferably at least 100 rpm.

The process can be performed without catalyst or in the presence of at least one catalyst.

Non-limiting examples of suitable catalysts include non-grafted catalysts, such as 2,2'-dimorpholinodiethylether (DMDEE, available commercially from Huntsman), and pre-grafted catalysts, such as dimethylethanolamine (DMEA) and 2(2-dimethylaminoethoxy)ethanol (DMEE).

In some embodiments, the catalyst is an organometallic catalyst. In these embodiments, the catalyst comprises an element selected from the group comprising tin, iron, lead, bismuth, mercury, titanium, hafnium, zirconium, and combinations thereof. In certain embodiments, the catalyst comprises a tin catalyst. Suitable tin catalysts, for purposes of the present invention, may be selected from tin(II) salts of organic carboxylic acids, e.g. tin(II) acetate, tin(II) octoate, tin(II) ethylhexanoate and tin(II) laurate. In some embodiments, the organometallic catalyst comprises dibutyltin dilaurate, which is a dialkyltin(IV) salt of an organic carboxylic acid. Specific examples of suitable organometallic catalyst, e.g. dibutyltin dilaurates, for purposes of the present invention, are commercially available from Air Products and Chemicals, Inc. The organometallic catalyst can also comprise other dialkyltin(IV) salts of organic carboxylic acids, such as dibutyltin diacetate, dibutyltin maleate and dioctyltin diacetate.

Non-limiting examples of other suitable catalysts may be selected from the group comprising iron(II) chloride; zinc chloride; lead octoate; tris(dialkylaminoalkyl)-s-hexahydrotriazines including tris(N,N-dimethylaminopropyl)-s-hexahydrotriazine; N,N,N',N'-tetramethylethylenediamine, N,N-dimethylaminopropylamine, pentamethyldipropylenetriamine, tris(dimethylaminopropyl)amine, N,N-dimethylpiperazine, tetramethylimino-bis (propylamine), dimethylbenzylamine, trimethyl amine, triethanolamine, N,N-diethyl ethanolamine, N-methylpyrrolidone, N-methylmorpholine, N-ethylmorpholine, bis(2-dimethylamino-ethyl)ether, N,N-dimethylcyclohexylamine (DMCHA), N,N,N',N',N''-pentamethyldiethylenetriamine, 1,2-dimethylimidazole, 3-(dimethylamino) propylimidazole; N,N,N-dimethylaminopropylhexahydrotriazine, potassium 2-ethylhexanoate, potassium acetate, N,N,N-trimethyl isopropyl amine/formate, and combinations thereof.

In another embodiment, the catalyst is a polyhedral oligomeric metallo silsesquioxane compound as described in WO 2014/173638, included herein by reference.

It is to be appreciated that the catalyst component may include any combination of two or more of the aforementioned catalysts.

Preferably, the catalyst can be present in an amount of at least 10 ppm, for example at least 0.01% by weight, for example at most 5% by weight, for example at least 0.20% by weight, with % by weight being based on the total weight of the reaction mixture.

According to a third aspect, the invention encompasses a formulation comprising at least one isocyanate; wherein said at least one isocyanate comprises 2,4'-methylene diphenyl diisocyanate,
at least one isocyanate-reactive compound and/or the adduct of said at least one isocyanate and said at least one isocyanate-reactive compound; and
at least one aminosilane;
wherein said at least one isocyanate comprises less than 50.0% by weight of said 2,4'-methylene diphenyl diisocyanate based on the total weight of said at least one isocyanate.

The descriptions of the isocyanate, the isocyanate-reactive compound and the aminosilane, for the polyurethane, apply mutatis mutandis to the formulation according to the third aspect of the invention.

According to a fourth aspect, the invention encompasses a composition comprising a silylated polyurethane according to the first aspect of the invention.

In some embodiments, said composition or formulation further comprises one or more additives selected from the group comprising (but not limited to) fillers (coated or uncoated), adhesion promoters, moisture scavengers, plasticizers, UV and/or light stabilizers, thixotropic agents, colourants (pigments and reactive dyes), catalysts, fire/flame retardant systems and so on or combinations thereof; specific examples of which are given above.

The silylated polyurethane can also be mixed with other polymers such as epoxies or polyurethanes or acrylics to have IPN type materials.

The present invention also encompasses the use of a silylated polyurethane according to the first aspect of the invention, or a composition according to the fourth aspect of the invention or a formulation according to the third aspect of the invention, for the preparation of adhesives, coatings, sealants, elastomers, or foams. The invention also encompasses said prepared adhesives, coatings, sealants, elastomers, foams (such as one component foam).

According to a fifth aspect, the invention also encompasses a product comprising a silylated polyurethane according to the first aspect of the invention, or a composition according to the fourth aspect of the invention, or obtained by curing a formulation according to the third aspect of the invention. Said curing may involve one-component curing (moisture curing) or two-component curing whereby the second component introduces the water or a polyhydroxy functional group or latent water.

Non-limiting list of suitable products comprises adhesives, coatings, sealants, elastomers, foams and the like.

In some embodiments, the product may be an adhesive. In some embodiments, the product may be an elastomer. In some other embodiments, the product may be a foam such as a one component foam. In yet other embodiments, the product may be a coating.

The invention is illustrated but not limited by the following examples.

EXAMPLES

The examples described hereunder illustrate the properties of the products and compositions according to embodiments of the present invention. Unless otherwise indicated, all parts and all percentages in the following examples, as well as throughout the specification, are parts by weight or percentages by weight respectively.

Methods

The following methods were used in the examples:

The OH value (OHv) (also referred to as OH number or OH content) was measured according to the ASTM D 1957 standard. In brief, hydroxyl groups are acetylated with acetic anhydride in the presence of pyridine and heat. The excess acetic anhydride is hydrolyzed with water and the resulting acetic acid is titrated with standard potassium hydroxide solution. The OH value is expressed in mg KOH/g sample. The OH value was calculated using the following equation: OHv (mg KOH/g)=56.1×(B−A)×N/S wherein S represents a sample weight (g); A represents the amount (mL) of the solution of potassium hydroxide required for titrating the sample; B represents the amount (mL) of the solution of potassium hydroxide required for a blank test; and N represents the normality of the potassium hydroxide solution.

The NCO value (NCOv) (or percent NCO) of the prepolymer or of the at least one isocyanate, given in weight %, was measured according to the DIN 53185 standard. In brief, isocyanate is reacted with an excess of di-n-butylamine to form ureas. The unreacted amine is then titrated with standard nitric acid to the color change of bromocresol green indicator or to a potentiometric endpoint. The percent NCO or NCO-value is defined as the percent by weight of NCO-groups present in the product.

The functionality of the polyetherpolyol was determined by 13C-NMR spectroscopy.

Free NCO was monitored during the reaction using infrared analysis. Reactions were considered terminated after total disappearance of the infrared NCO stretch at 2270 $cm^{-1}$.

Viscosity was measured using a Brookfield Viscometer (model DV-II, spindle 21, rpm according 30-80% of full scale) according to the ASTM D 4889 standard without any plasticizer added to the polymer, at a temperature of 25° C.

Example 1 (According to the Invention)

The following ingredients were used in the preparation of the Polymer 1:

Isocyanate-1: a mixture of 37% 2,4'-methylene diphenyl diisocyanate and 63% 4,4'-methylene diphenyl diisocyanate; with an NCO value of 33.6%, commercially available from Huntsman Polyurethanes, under trade name Suprasec® 3030.

Polyetherdiol-1: PPG2000, polypropyleneglycol having a number average molecular weight of 2000 Da, with a OH value of 55.6 mg KOH/g, with a functionality of 2; commercially available from Huntsman Polyurethanes, under trade name Daltocel® F456.

Amine-1: gamma-N-butylaminopropyltrimethoxysilane, commercially available from Evonik under the trade name Dynasylan® 1189.

Step (a): Isocyanate-1 was weighted into a reaction flask under nitrogen atmosphere. Polyetherdiol-1 was dried under vacuum at 100° C. and after cooling to 70° C., added to the isocyanate-1 (2.1 mole of NCO per mole of OH) while blanketing with nitrogen and stirring vigorously. Temperature was then maintained until a constant isocyanate value was reached. The NCO content of the prepolymer of step (a) was 3.38%.

Step (b): To the prepolymer of step (a), amine-1 was added dropwise at 50° C. in a molar ratio of amine to NCO of 1.05. Stirring was continued until free NCO was no longer detected. The silylated polymer 1 was then filled into containers flushed with nitrogen.

The viscosity of the silylated polymer 1 was measured. The silylated polymer 1 had a viscosity of 93 Pa·s.

Example 2 (Comparative Example)

The following ingredients were used in the preparation of the Polymer 2:

Isocyanate-2: 4,4'-Diphenylmethane diisocyanate (4,4'-MDI) (with an NCO value of 33.6%), commercially available from Huntsman Polyurethanes, under trade name Suprasec® 1306.

Polyetherdiol-1: was as described in example 1.

Amine-1: was as described in example 1.

(step a): Isocyanate-2 was weighted into a reaction flask under nitrogen atmosphere. Polyether diol-1 was dried under vacuum at 100° C. and after cooling to 70° C., added to the isocyanate-2 (2.1 mole of NCO per mole of OH) while blanketing with nitrogen and stirring vigorously. Temperature was then maintained until a constant isocyanate value was reached. The NCO content of the prepolymer of step (a) was 3.38%.

Step (b): To the prepolymer of step (a), amine-1 was added dropwise at 50° C. in a molar ratio of amine to NCO of 1.05. Stirring was continued until free NCO was no longer detected. The silylated polymer 2 was then filled into containers flushed with nitrogen.

The viscosity of the silylated polymer 2 was measured. The silylated polymer 2 had a viscosity of 123 Pa·s.

Examples 1 and 2 demonstrate that the use of an isocyanate comprising 2,4'-MDI significantly reduces the viscosity of the silylated polymer.

Example 3 (According to the Invention)

The following ingredients were used in the preparation of the Polymer 3:

Isocyanate-1: was as described in example 1.

Polyetherpolyol-2: polypropyleneglycol having a number average molecular weight of 3960 Da, with a OH value of 34 mg KOH/g, with a functionality of 2.4; commercially available from Huntsman Polyurethanes, under trade name Daltocel® F435.

Amine-1: was as described in example 1.

(Step a): Isocyanate-1 was weighted into a reaction flask under nitrogen atmosphere. Polyetherpolyol-2 was dried under vacuum at 100° C. and after cooling to 70° C., added to the isocyanate-1 (4.0 mole of NCO per mole of OH) while blanketing with nitrogen and stirring vigorously. Temperature was then maintained until a constant isocyanate value was reached. The NCO content of the prepolymer of step (a) was 5.88%.

Step (b): To the prepolymer of step (a), amine-1 was added dropwise at 50° C. in a molar ratio of amine to NCO of 1.05. Stirring was continued until free NCO was no longer detected. The silylated polymer 3 was then filled into containers flushed with nitrogen.

The viscosity of the silylated polymer 3 was measured. The silylated polymer 3 had a viscosity of 52 Pa·s.

Example 4 (According to the Invention)

The following ingredients were used in the preparation of the Polymer 4:

Isocyanate-1: was as described in example 1.

Polyetherpolyol-2: polypropyleneglycol having a number average molecular weight of 3960 Da, with a OH value of 34 mg KOH/g, with a functionality of 2.4; commercially available from Huntsman Polyurethanes, under trade name Daltocel® F435.

Amine-1: was as described in example 1.

(Step a): Isocyanate-1 was weighted into a reaction flask under nitrogen atmosphere. Polyetherpolyol-2 was dried under vacuum at 100° C. and after cooling to 70° C., added to the isocyanate-1 (5.0 mole of NCO per mole of OH) while blanketing with nitrogen and stirring vigorously. Temperature was then maintained until a constant isocyanate value was reached. The NCO content of the prepolymer of step (a) was 7.47%.

Step (b): To the prepolymer of step (a), amine-1 was added dropwise at 50° C. in a molar ratio amine to NCO of 1.05. Stirring was continued until free NCO was no longer detected. The silylated polymer 4 was then filled into containers flushed with nitrogen.

The viscosity of the silylated polymer 4 was measured. The silylated polymer 4 had a viscosity of 58 Pa·s.

Example 5 (According to the Invention)

The following ingredients were used in the preparation of the Polymer 5:

Isocyanate-1: was as described in example 1.

Polyetherpolyol-2: polypropyleneglycol having a number average molecular weight of 3960 Da, with a OH value of 34 mg KOH/g, with a functionality of 2.4; commercially available from Huntsman Polyurethanes, under trade name Daltocel® F435.

Amine-1: was as described in example 1.

(Step a): Isocyanate-1 was weighted into a reaction flask under nitrogen atmosphere. Polyetherpolyol-2 was dried under vacuum at 100° C. and after cooling to 70° C., added to the isocyanate-1 (6.0 mole of NCO per mole of OH) while blanketing with nitrogen and stirring vigorously. Temperature was then maintained until a constant isocyanate value was reached. The NCO content of the prepolymer of step (a) was 8.91%.

Step (b): To the prepolymer of step (a), amine-1 was added dropwise at 50° C. at a molar ratio of amine to NCO of 1.05. Stirring was continued until free NCO was no longer detected. The silylated polymer 5 was then filled into containers flushed with nitrogen.

The viscosity of the silylated polymer 5 was measured. The silylated polymer 5 had a viscosity of 59 Pa·s.

Example 6 (Comparative Example)

The following ingredients were used in the preparation of the Polymer 6:

Isocyanate-2: was as described in comparative example 2.
Polyetherpolyol-2: was as described in example 3.
Amine-1: was as described in example 1.

(Step a): Isocyanate-2 was weighted into a reaction flask under nitrogen atmosphere. Polyetherpolyol-2 was dried under vacuum at 100° C. and after cooling to 70° C., added to the isocyanate-2 (4.0 mole of NCO per mole of OH) while blanketing with nitrogen and stirring vigorously. Temperature was then maintained until a constant isocyanate value was reached. The NCO content of the prepolymer of step (a) was 5.90%.

Step (b): To the prepolymer of step (a), amine-1 was added dropwise at 50° C. in a molar ratio of amine to NCO of 1.05. Stirring was continued until free NCO was no longer detected. The silylated polymer 6 was then filled into containers flushed with nitrogen.

The viscosity of the silylated polymer 6 was measured. The silylated polymer 6 was obtained as a viscous gel (no viscosity measured).

Example 7 (Comparative Example)

The following ingredients were used in the preparation of the Polymer 7:

Isocyanate-3: Uretonimine-enriched 4,4'-diphenylmethane diisocyanate; with an NCO value of 29.5%, commercially available from Huntsman Polyurethanes, under trade name Suprasec® 2020.

Polyetherpolyol-2: was as described in example 3.
Amine-1: was as described in example 1.

Step (a): Isocyanate-3 was weighted into a reaction flask under nitrogen atmosphere. Polyetherpolyol-2: was dried under vacuum at 100° C. and after cooling to 70° C., added to the isocyanate-3 (4.0 mole of NCO per mole of OH) while blanketing with nitrogen and stiffing vigorously. Temperature was then maintained until a constant isocyanate value was reached. The NCO content of the prepolymer of step (a) was 5.69%.

Step (b): To the prepolymer of step (a), amine-1 was added dropwise at 50° C. in a molar ratio of amine to NCO of 1.05. Stirring was continued until free NCO was no longer detected. The silylated polymer 7 was then filled into containers flushed with nitrogen.

The viscosity of the silylated polymer 7 was measured. The silylated polymer 7 had a viscosity of 188 Pa·s.

Examples 3, 4, 5, 6 and 7 demonstrate that the use of 2,4'-MDI isomer significantly reduces the viscosity of silylated polyurethanes.

It is to be understood that although preferred embodiments have been discussed for providing embodiments according to the present invention, various modifications or changes may be made without departing from the scope and spirit of this invention.

The invention claimed is:

1. A silylated polyurethane obtained by a process comprising the step of contacting at least one isocyanate which comprises 2,4'-methylene diphenyl diisocyanate with at least one isocyanate-reactive compound and with at least one aminosilane; wherein said at least one isocyanate comprises at most 45% by weight of said 2,4'-methylene diphenyl diisocyanate based on the total weight of said at least one isocyanate and wherein the silylated polyurethane is moisture curable and has a viscosity of at most 100 Pa·s wherein the viscosity is measured at 25° C. using Brookfield Viscometer according to the ASTM D 4889 standard without any plasticizer added to the silylated polyurethane.

2. The silylated polyurethane according to claim 1, wherein said at least one isocyanate-reactive compound comprises at least one isocyanate-reactive group and wherein the molar ratio of the isocyanate groups of said at least one isocyanate to the isocyanate-reactive groups of said at least one isocyanate-reactive compound is of at least 1.1.

3. The silylated polyurethane according to claim 1, wherein said at least one isocyanate comprises at most 40% by weight of 2,4'-methylene diphenyl diisocyanate based on the total weight of said at least one isocyanate.

4. The silylated polyurethane according to claim 1, wherein said at least one isocyanate is a mixture comprising 2,4'-methylene diphenyl diisocyanate and at least one polyisocyanate selected from the group comprising 2,2'-methylene diphenyl diisocyanate; 4,4'-methylene diphenyl diisocyanate; hexamethylene diisocyanate; m- and p-phenylene diisocyanate; tolylene-2,4-diisocyanate; tolylene-2,6-diisocyanate; chlorophenylene-2,4-diisocyanate, naphthyl ene-1,5-diisocyanate, diphenylene-4,4'-diisocyanate, 4,4'-diisocyanate-3,3'-dimethyl-diphenyl, 3-methyl-diphenylmethane-4,4'-diisocyanate; diphenyl ether diisocyanate; cyclohexane-2,4-diisocyanate; cyclohexane-2,3-diisocyanate; 1-methylcyclohexyl-2,4-diisocyanate; 1-methylcyclohexyl-2,6-diisocyanate; bis-(isocyanatocyclohexyl)methane; 2,4,6-triisocyanatotoluene; 2,4,4-triisocyanatodiphenylether, isophorone diisocyanate, butylene diisocyanate, trimethylhexamethylene diisocyanate, isocyanatomethyl-1,8-octane diisocyanate, tetramethylxylene diisocyanate, 1,4-cyclohexanediisocyanate, and tolidine diisocyanate (TODI); oligomers such as pMDI, polymers, and mixtures thereof.

5. The silylated polyurethane according to claim 1, wherein said at least one isocyanate is a mixture comprising 2,4'-methylene diphenyl diisocyanate and a polyisocyanate selected from the group comprising 2,2'-methylene diphenyl diisocyanate, 4,4'-methylene diphenyl diisocyanate, oligomers thereof, prepolymers thereof; and mixtures thereof.

6. The silylated polyurethane according to claim 1, wherein said silylated polyurethane is obtainable by (a) contacting at least one isocyanate with at least one isocyanate-reactive compound and (b) contacting the product of step (a) with at least one aminosilane; and wherein the molar ratio of said at least one aminosilane, to the NCO isocyanate groups of the product of step (a) is greater than 0.5.

7. The silylated polyurethane according to claim 1, wherein said at least one aminosilane is a compound of formula (I),

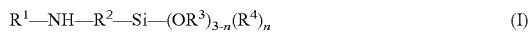

wherein,
R$^1$ is selected from H; C$_{1-24}$ alkyl; C$_{3-24}$ cycloalkyl; C$_{6-24}$ aryl; or heteroaryl; and wherein said C$_{1-24}$ alkyl; C$_{3-24}$ cycloalkyl; C$_{6-24}$ aryl; or heteroaryl can be unsubstituted or substituted with one or more alkyl groups, cycloalkyl groups, aryl groups, halogen atoms or COOH groups;
R$^2$ is selected from C$_{1-20}$ alkylene or C$_{6-20}$ arylene;
R$^3$ is selected from C$_{1-20}$ alkyl; and C$_{6-20}$ aryl;
R$^4$ is selected from C$_{1-20}$ alkyl; and C$_{6-20}$ aryl;
n is an integer selected from 0, 1 or 2.

8. The silylated polyurethane according to claim 1, wherein said at least one aminosilane is selected from the group comprising gamma-N-phenylaminopropyltrimethoxysilane, alpha-N-phenylaminomethyltrimethoxysilane, gamma-N-phenylaminopropyldimethoxymethylsilane, alpha-N-phenylaminomethyldimethoxymethylsilane, gamma-N-phenyl aminopropyltriethoxysilane, alpha-N-phenylaminomethyltriethoxysilane, gamma-N-phenylaminopropyldiethoxyethylsilane, alpha-N-phenylaminomethyldiethoxyethylsilane, gamma-N-butylaminopropyltrimethoxysilane, alpha-N-butylaminomethyltrimethoxysilane, gamma-N-butylaminopropyldimethoxymethylsilane, alpha-N-butylaminomethyldimethoxymethylsilane, gamma-N-butylaminopropyltriethoxysilane, alpha-N-butylaminomethyltriethoxysilane, gamma-N-butylaminopropyldiethoxyethylsilane, alpha-N-butylaminomethyldiethoxyethylsilane, gamma-N-methylaminopropyltrimethoxysilane, alpha-N-methylaminomethyltrimethoxysilane, gamma-N-methylaminopropyldimethoxymethylsilane, alpha-N-methylaminomethyldimethoxymethylsilane, gamma-N-methyl aminopropyltriethoxysilane, alpha-N-methylaminomethyltriethoxysilane, gamma-N-methylaminopropyldiethoxyethylsilane, alpha-N-methylaminomethyldiethoxy ethylsilane, gamma-N-cyclohexylaminopropyltrimethoxysilane, alpha-N-cyclohexylaminomethyltrimethoxysilane, gamma-N-cyclohexylaminopropyldimethoxymethyl silane, alpha-N-cyclohexylaminomethyldimethoxymethylsilane, gamma-N-cyclohexylaminopropyltriethoxysilane, alpha-N-cyclohexylaminomethyltriethoxysilane, gamma-N-cyclohexylaminopropyldiethoxyethylsilane, alpha-N-cyclohexylaminomethyldiethoxyethylsilane, gamma-aminopropyltrimethoxysilane, alpha-aminomethyltrimethoxysilane, gamma-aminopropyldimethoxymethylsilane, alpha-aminomethyldimethoxymethylsilane, gamma-aminopropyltriethoxysilane, alpha-aminomethyltriethoxysilane, gamma-aminopropyldiethoxyethylsilane, alpha-aminomethyldiethoxyethylsilane and mixtures thereof.

9. The silylated polyurethane according to claim 1, wherein said at least one aminosilane is selected from the group comprising gamma-N-phenylaminopropyltrimethoxysilane, gamma-N-butylaminopropyltrimethoxysilane, gamma-N-methylaminopropyltrimethoxysilane, gamma-N-cyclohexylaminopropyltrimethoxysilane, gamma-aminopropyltrimethoxysilane, and mixtures thereof.

10. A process for preparing a silylated polyurethane according to claim 1, wherein the process comprises the steps of:
(a) contacting at least one isocyanate with at least one isocyanate-reactive compound to form a reaction product;
(b) contacting the reaction product of step (a) with at least one aminosilane thereby preparing a silylated polyurethane; wherein said at least one isocyanate comprises 2,4'-methylene diphenyl diisocyanate, and wherein said at least one isocyanate comprises less than 50.0% by weight of said 2,4'-methylene diphenyl diisocyanate based on the total weight of said at least one isocyanate.

11. A composition comprising a silylated polyurethane as defined in claim 1 and optionally one or more additives.

* * * * *